Aug. 19, 1924.
J. F. O'CONNOR
1,505,414
FRICTION SHOCK ABSORBING MECHANISM
Filed Oct. 4, 1920
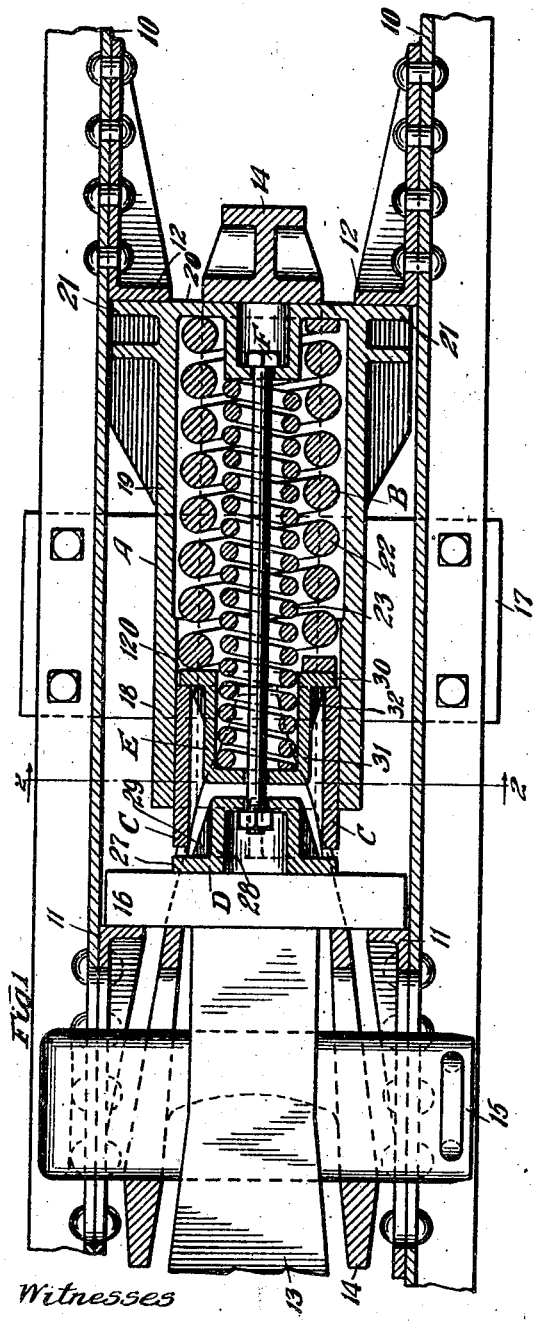
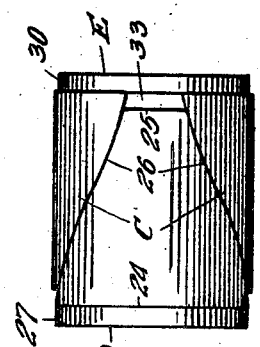
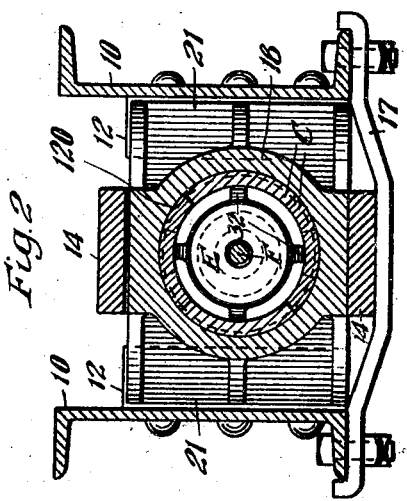
Witnesses
Wm. Geiger
Inventor
John F. O'Connor
By Geo. I. Haight
His Atty.

Patented Aug. 19, 1924.

1,505,414

UNITED STATES PATENT OFFICE.

JOHN F. O'CONNOR, OF CHICAGO, ILLINOIS, ASSIGNOR, BY MESNE ASSIGNMENTS, TO W. H. MINER, INC., A CORPORATION OF DELAWARE.

FRICTION SHOCK-ABSORBING MECHANISM.

Application filed October 4, 1920. Serial No. 414,664.

*To all whom it may concern:*

Be it known that I, JOHN F. O'CONNOR, a citizen of the United States, residing at Chicago, in the county of Cook and State of Illinois, have invented a certain new and useful Improvement in Friction Shock-Absorbing Mechanisms, of which the following is a full, clear, concise, and exact description, reference being had to the accompanying drawings, forming a part of this specification.

This invention relates to improvements in friction shock absorbing mechanisms.

One object of the invention is to provide a friction shock absorbing mechanism for railway draft riggings wherein the friction shoes are so designed as to produce the wedging or expanding effect by action on each other.

Another object of the invention is to provide a friction shock absorbing mechanism having a plurality of friction elements which possess and combine the characteristics of both friction shoes proper and wedges proper and wherein said elements are so formed and arranged as to be inherently expansible and contractible as a unit to thereby facilitate release while at the same time permitting of high capacity.

In the drawing forming a part of this specification, Figure 1 is a horizontal longitudinal sectional view of a portion of a railway draft rigging showing my improvements in connection therewith. Figure 2 is a vertical transverse sectional view corresponding substantially to the line 2—2 of Figure 1. And Figure 3 is an elevational view of the movable friction elements and immediately associated parts.

In said drawing, 10—10 denote channel center or draft sills of a railway car to the inner faces of which are secured front stop lugs 11 and rear stop lugs 12 of any desired type. The rear portion of the drawbar is indicated at 13, the same being connected to a hooded cast yoke 14 by means of a coupler key 15. The shock absorbing mechanism proper, hereinafter described, is disposed within said yoke as is also a front follower 16. The yoke and parts therewithin are supported by any suitable means such as the detachable saddle plate 17.

The improved shock absorbing mechanism, as shown, comprises, broadly, a combined friction shell and spring cage casting A; a spring resistance B; a plurality of circularly arranged annular segmental friction shoes C—C; an outer cap D; an inner cap or spring follower E; and a retainer bolt F.

In carrying out my invention, the casting A is preferably made with the friction shell proper 18 at the front end thereof and the spring cage 19 at the rear end. The shell 18 is of cylindrical form having an interior cylindrical friction surface 120. The spring cage 19 is also generally of cylindrical form and is provided with an integral rear wall 20 with lateral extensions 21 adapting the rear end of the casting A to act as the rear follower of the mechanism in cooperation with the stop lugs 12.

The spring B preferably consists of an outer heavy coil 22 and an inner lighter nested coil 23. The retainer bolt F passes through suitable alined perforations in the caps D and E and in the rear wall 20 and, as will be understood by those skilled in the art, is adapted to maintain the parts is assembled relation and also to place the spring B under an initial compression, when desired.

As shown, I employ four friction elements C of like construction, two of them extending in one direction and the other two in the opposite direction and alternated as clearly indicated in Figure 3. Each of said elements C, considered in section as indicated in Figure 2, constitutes a portion of an annulus the exterior periphery of which coincides with the shell friction surface 120. Each element C is formed with transversely extending, parallel, inner and outer edges 24 and 25 and with converging side edges 26—26. The said side edges 26, as shown in Figure 2, coincide with radially extending planes passing through the axis of the friction shell.

The front or outer cap D is formed with a laterally extended annular flange 27 and an inwardly extended cup or hollow boss 28. Strengthening and centering longitudinally extending tapered flanges 29 are formed on said cap on the inner side of the flange 27 and outer side of the boss 28. The flange 27 is made of sufficient diameter so as to substantially equal the interior diameter of the shell 18 and bears upon the edges 24 of the two outer friction elements C as shown most clearly in Figure 3.

The inner cap or spring follower E is also formed with a laterally extended annular flange 30 and a forwardly extended cup or hollow boss 31 which forms a seat for the forward end of the spring coil 23. Said cap E is also provided with longitudinally extending, tapered, strengthening ribs 32 in the corners formed between the cut portion and the flange 30. Said ribs 32 are so designed as to center said cap with respect to the friction elements C, as will be clear from an inspection of Figure 1. The annular flange 30 has bearing against the inner edges 24 of the remaining two friction elements C as shown in Figure 3 and also provides a bearing for the front end of the outer heavy spring coil 22.

In carrying out my invention, the elements C will be so designed that, when assembled as shown in Figure 3, with the outer periphery corresponding to the friction surface 120 of the shell, the two friction elements C having their wide ends nearest the front follower 16, will project beyond the narrow ends 25 of the two remaining friction elements C as shown in Figures 1 and 3. Obviously there will be a corresponding space as indicated at 33 in Figure 3 between the two forward friction elements and the cap E. The elements C are preferably made of like construction and of relatively thin section spring steel formed and tempered, or other suitable material commonly understood as possessing inherent resiliency.

The operation is as follows, assuming an inward or buffing movement of the drawbar. When the drawbar is forced inwardly thus moving the front follower 16 correspondingly, the cap D will transmit the pressure to the two outermost friction elements C. Due to the wedge acting edges 26—26 of all of the friction elements C, there will be an immediate expansion of the friction elements to increase the circumference of the unit or plug constituted by said elements. The innermost set or group of friction elements C will of course be yieldingly resisted by the spring B acting through the cap E. In addition to the expansion of the friction unit or plug occurring as a result of the elements C moving relatively longitudinally, which reduces the over-all length of the unit, there is a flexing of each of the elements C in a manner tending to straighten each of them as the same automatically conform to the circumference of larger diameter arising in the friction unit or plug itself and a corresponding expansion of the friction shell due to the radial pressure exerted thereagainst. As the friction unit or block is forced inwardly of the shell, it is obvious that friction is generated between the elements C and the shell friction surface 120, the spring resistance being several times multiplied because of the inner set of friction elements C being directly resisted by the spring. Upon removal of the actuating force or the load, the friction elements C will, initially, in the release action, automatically flex or bend to assume their initial or normal curvature, thus automatically decreasing the circumference of the friction unit or plug as an entirety and therefore permitting the spring to react and project all of the friction elements outwardly to their normal full released position.

I have herein shown and described what I now consider the preferred manner of carrying out my invention, but I am aware that various changes and modifications may be made in the details of construction and arrangement of parts without departing from the spirit of the invention and all such changes and modifications are contemplated that come within the scope of the claims appended hereto.

I claim:

1. In a friction shock absorbing mechanism, the combination with a friction shell and spring resistance; of a plurality of flexible, resilient elements arranged to cooperate with said shell as friction shoes, said elements being arranged in two groups with those of one group alternated with those of the other group, each of said elements being of wedge shape in a lengthwise direction, said elements cooperating with each other as wedges, and all of the elements, considered as a unit, being capable of expansion and contraction.

2. In a friction shock absorbing mechanism, the combination with a friction shell having an interior cylindrical friction surface; of a spring resistance; and a plurality of flexible, resilient segmental wedge friction shoes, said shoes being arranged in an annular series having engaging edges extending radially to the shell, and all of said shoes together constituting a friction plug cooperable with the shell, the shell being expansible and contractible.

3. In a friction shock absorbing mechanism, the combination with a friction shell having an interior cylindrical friction surface; of a plurality of annular, segmental, wedge friction shoes each formed of steel and flexible radially; a follower interposed between one end of said spring and the inner ends of some of said friction shoes; and means for transmitting pressure to the outer end of the remaining friction shoe.

In witness that I claim the foregoing I have hereunto subscribed my name this 17th day of Sept. 1920.

JOHN F. O'CONNOR.

Witness:
CARRIE GAILING.